(12) United States Patent
Martin et al.

(10) Patent No.: US 11,497,164 B2
(45) Date of Patent: Nov. 15, 2022

(54) HEADER SUSPENSION FOR PIVOTING HEADER OF COMBINE HARVESTER

(71) Applicant: CNH Industrial America LLC, New Holland, PA (US)

(72) Inventors: Jethro Martin, Ephrata, PA (US); Blaine R. Noll, Fleetwood, PA (US); Benjamin Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 460 days.

(21) Appl. No.: 16/660,332

(22) Filed: Oct. 22, 2019

(65) Prior Publication Data
US 2021/0112713 A1 Apr. 22, 2021

(51) Int. Cl.
*A01D 41/06* (2006.01)
*A01D 41/14* (2006.01)
(Continued)

(52) U.S. Cl.
CPC ............ *A01D 41/06* (2013.01); *A01B 63/002* (2013.01); *A01B 63/10* (2013.01); *A01D 41/14* (2013.01); *A01D 41/145* (2013.01); *A01B 63/008* (2013.01); *A01D 41/12* (2013.01); *A01D 41/127* (2013.01); *A01D 75/287* (2013.01);
(Continued)

(58) Field of Classification Search
CPC ..... A01B 63/10; A01B 63/008; A01B 63/002; A01D 41/06; A01D 41/12; A01D 41/127; A01D 41/14; A01D 41/141; A01D 41/145; A01D 75/287; F15B 11/08; F15B 21/005; F15B 21/087; G05B 15/02
See application file for complete search history.

(56) References Cited

U.S. PATENT DOCUMENTS 3,509,701 A * 5/1970 Clarke ................. A01D 41/145
56/208
3,589,115 A 6/1971 Taylor et al.
(Continued)

FOREIGN PATENT DOCUMENTS

AU 2019200601 A1 * 8/2019 ........... A01D 41/141
AU 2019202982 B2 * 7/2020 ........... A01B 63/008
(Continued)

OTHER PUBLICATIONS

PCT International Search Report and Written Opinion for PCT application PCT/US2020/056931, dated Jan. 25, 2021 (12 pages).

*Primary Examiner* — Arpad Fabian-Kovacs
(74) *Attorney, Agent, or Firm* — Peter Zacharias; Patrick Sheldrake (57) ABSTRACT

An agricultural vehicle header suspension having a frame, a plurality of supports extending forward from the frame, an anchor plate, a frame pivot joining the frame to the anchor plate to be rotatable about a frame pivot axis, a frame actuator connected between the anchor plate and the frame and configured to resiliently hold the frame at a predetermined position relative to the anchor plate, and to allow the frame to move through a range of motion relative to the anchor plate, upon compression and/or extension of the frame actuator. The frame actuator may be, for example, at least one single-acting hydraulic actuator, mechanical spring, or a pneumatic cylinder.

21 Claims, 3 Drawing Sheets

(51) Int. Cl.
  *A01B 63/00* (2006.01)
  *A01B 63/10* (2006.01)
  *A01D 75/28* (2006.01)
  *A01D 41/127* (2006.01)
  *A01D 41/12* (2006.01)
  *F15B 11/08* (2006.01)
  *G05B 15/02* (2006.01)
  *F15B 21/00* (2006.01)
  *F15B 21/08* (2006.01)

(52) U.S. Cl.
  CPC ............ *F15B 11/08* (2013.01); *F15B 21/005* (2013.01); *F15B 21/087* (2013.01); *G05B 15/02* (2013.01)

(56) References Cited

U.S. PATENT DOCUMENTS

| | | | |
|---|---|---|---|
| 4,473,993 A * | 10/1984 | Jennings | A01D 34/28 56/192 |
| 4,724,661 A | 2/1988 | Blakeslee et al. | |
| 5,633,452 A | 5/1997 | Bebernes | |
| 5,704,200 A * | 1/1998 | Chmielewski, Jr. | A01D 41/141 56/10.2 E |
| 6,901,729 B1 * | 6/2005 | Otto | A01D 41/145 56/208 |
| 7,207,164 B2 | 4/2007 | Bomleny | |
| 7,222,475 B2 | 5/2007 | Bomleny et al. | |
| 7,430,846 B2 | 10/2008 | Bomleny et al. | |
| 7,555,883 B2 * | 7/2009 | Fackler | A01D 41/145 56/10.2 E |
| 7,703,266 B2 * | 4/2010 | Fackler | A01D 41/145 56/10.2 E |
| 7,707,811 B1 * | 5/2010 | Strosser | A01D 41/141 56/10.2 E |
| 7,992,369 B2 * | 8/2011 | Coers | A01D 41/141 56/10.2 E |
| 9,043,955 B2 * | 6/2015 | Nafziger | A01D 47/00 |
| 10,216,156 B2 | 2/2019 | Enns et al. | |
| 2003/0074876 A1 * | 4/2003 | Patterson | A01D 41/14 56/257 |
| 2006/0254233 A1 | 11/2006 | Bomleny | |
| 2008/0078155 A1 * | 4/2008 | Coers | A01D 41/141 56/15.8 |
| 2008/0276590 A1 * | 11/2008 | Sauerwein | A01D 41/14 56/153 |
| 2009/0069988 A1 * | 3/2009 | Strosser | A01D 41/141 701/50 |
| 2009/0277147 A1 * | 11/2009 | Honas | A01D 57/20 56/208 |
| 2010/0043368 A1 * | 2/2010 | Sloan | A01D 41/145 56/10.2 E |
| 2010/0281837 A1 * | 11/2010 | Talbot | A01D 41/141 56/10.2 E |
| 2011/0047946 A1 * | 3/2011 | Otto | F15B 13/044 56/10.2 E |
| 2013/0298515 A1 * | 11/2013 | Lohrentz | A01D 41/141 56/51 |
| 2014/0000230 A1 * | 1/2014 | Kohlhase | A01D 41/141 56/10.2 E |
| 2016/0037721 A1 * | 2/2016 | Teach | F15B 21/087 60/328 |
| 2016/0150716 A1 * | 6/2016 | De Coninck | A01B 63/008 56/153 |
| 2017/0359955 A1 * | 12/2017 | Dunn | F15B 13/0401 |
| 2018/0153101 A1 * | 6/2018 | Dunn | A01B 63/008 |
| 2018/0153102 A1 * | 6/2018 | Dunn | A01D 41/127 |
| 2019/0029175 A1 | 1/2019 | Talbot et al. | |
| 2019/0230857 A1 * | 8/2019 | Thomson | A01D 41/145 |
| 2020/0337240 A1 * | 10/2020 | Brimeyer | A01B 63/008 |
| 2020/0337241 A1 * | 10/2020 | Brimeyer | A01D 41/142 |
| 2021/0063265 A1 * | 3/2021 | Smith | A01B 63/108 |

FOREIGN PATENT DOCUMENTS

| | | | | |
|---|---|---|---|---|
| CA | 2823199 A1 * | 2/2014 | | A01D 41/141 |
| CA | 3071747 A1 * | 9/2020 | | A01D 41/06 |
| CA | 3078745 A1 * | 9/2020 | | A01D 41/145 |
| DE | 3337789 A1 | 4/1984 | | |
| DE | 102020200493 A1 * | 7/2020 | | A01D 69/03 |
| DE | 102020204975 A1 * | 10/2020 | | A01D 41/141 |
| EP | 0243540 A1 * | 11/1987 | | A01D 75/287 |
| EP | 0286736 A1 * | 10/1988 | | A01D 75/287 |
| EP | 2832206 A1 * | 2/2015 | | A01D 34/008 |
| EP | 3520597 A1 | 8/2019 | | |
| EP | 3811762 A1 * | 4/2021 | | A01B 63/008 |
| WO | WO-0165917 A1 * | 9/2001 | | A01D 41/141 |
| WO | WO-2019111069 A1 * | 6/2019 | | A01D 57/20 |
| WO | WO-2019113672 A1 * | 6/2019 | | A01D 41/141 |

* cited by examiner

HEADER SUSPENSION FOR PIVOTING HEADER OF COMBINE HARVESTER

BACKGROUND OF THE INVENTION

Agricultural equipment, such as combines, swathers and windrowers, typically include a header that is movably attached to the chassis of the vehicle. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections.

During operation, the header might be raised or lowered to account for variations in the ground level, properties of the particular crop being harvested, and various other operating conditions. Thus, a typical header might be pivotally mounted to the vehicle chassis by way of a feeder housing. More specifically, the feeder housing might be pivotally mounted to the vehicle chassis at its proximal end, and rigidly connected to the frame of the header at its distal end. Height of the header is controlled via hydraulic cylinders, which move the feeder housing up and down about the pivot connection at the chassis. It is also known to provide additional position controls. For example, the foregoing system may be supplemented with a tilt adjust mechanism that pivots portions of the header forward and backward relative to the feeder housing. Other header position control might be provided by mounting portions of the header, such as cutter bars, on movable supports, which might allow the cutter bar to flex to conform to irregular ground.

A header having height and tilt adjust mechanisms such as described above may be operated by actively raising and lowering the header to account for undulations in the ground, while the cutter bar flexes up and down on support arms to track the local shape of the ground below each support arm. Such control typically requires the use of ground distance sensing equipment located below the header, and must operate the header height position controller to raise and lower the entire mass of the header. The inventors have found that such a system can be limited with respect to the drive speed of the vehicle, due to the fact that the control system cannot react quickly enough to lift the header over uneven terrain, leading to contact between the cutter bar and the ground.

Other systems are also known in the art. For example, U.S. Patent Pub. No. 2019/0029175 describes a header having a cutter bar (17) mounted to the feeder housing by a multi-bar linkage, with suspension springs (24) to allow the cutter bar to float, and a tilt-control actuator (26) to change the orientation of the cutter bar. A similar arrangement is shown in U.S. Pat. No. 7,207,164, in which the header includes a cutter bar subframe (52) that floats on a subframe (64) on lower and upper links (66, 68). Another similar arrangement is shown in U.S. Pat. No. 5,633,452, which shows the main body of the header (30) being mounted on and upper link (46) and a lower link (40). In each of the foregoing examples, the entire mass of the forward portion of the header moves up and down according to the geometry of the upper and lower links when traveling over undulations. Thus, these configurations are expected to have higher magnitudes of inertia that resist quick up and down movement as the vehicle increases in speed. The foregoing references are incorporated herein by reference.

While the state of the art provides various alternatives to header suspension design, there remains a need to advance the state of the art of header suspension systems.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle header suspension having a frame, a plurality of supports, each of the plurality of supports extending from a respective proximal end at the frame to a respective distal end located forward of the frame, an anchor plate, a frame pivot joining the frame to the anchor plate to be rotatable about a frame pivot axis, and a frame actuator connected between the anchor plate and the frame and configured to resiliently hold the frame at a predetermined position relative to the anchor plate, and to allow the frame to move through a range of motion relative to the anchor plate, upon compression and/or extension of the frame actuator, The frame actuator may comprise at least one single-acting hydraulic actuator joining the frame to the anchor plate, and a hydraulic circuit connected to a drive input of the frame actuator. The hydraulic circuit includes an accumulator in fluid communication with the drive input, and the hydraulic circuit is configured to allow the frame to pivot relative to the anchor plate about the frame pivot axis by displacing a quantity of hydraulic fluid from the at least one single-acting hydraulic actuator to the accumulator.

The frame actuator may comprise one or more mechanical or pneumatic springs.

In some exemplary aspects, one or more of the supports may be a movable support having a respective proximal end movably attached to the frame and a respective distal end movable in a vertical direction relative to the frame.

In some exemplary aspects, all of the supports comprise a movable support.

In some exemplary aspects, a cutter bar is attached to the respective distal ends of one or more of the supports.

In some exemplary aspects, the frame pivot joins a lower end of the frame to the anchor plate, and the frame actuator is located above the frame pivot and joins an upper portion of the frame to the anchor plate.

In some exemplary aspects, the header suspension includes a feeder housing extending from a proximal feeder housing end that is configured to be movably secured to a vehicle chassis, to a distal feeder housing end having a faceplate secured to the anchor plate. The faceplate may be mounted to the distal feeder housing end on a faceplate pivot to be rotatable about a faceplate pivot axis. The frame pivot axis may be parallel to the faceplate pivot axis. A faceplate actuator may be provided and configured to rotate the faceplate about the faceplate pivot axis. The faceplate actuator may include one or more double-acting hydraulic actuators. A feeder housing actuator may be provided and configured to move the feeder housing to raise and lower the frame.

In some exemplary aspects, the feeder housing actuator comprises one or more double-acting hydraulic actuators.

In some exemplary aspects, the hydraulic circuit comprises a resistance controller configured to selectively change at least one of a spring rate or a damping rate of the frame actuator. The resistance controller may be a variable flow restrictor.

In another exemplary aspect, there is provided an agricultural vehicle header suspension having a feeder housing having a proximal feeder housing end and a distal feeder housing end, a feeder housing actuator configured to raise and lower the distal feeder housing end relative to the proximal feeder housing end, and a header attached to the distal feeder housing end. The header includes a frame, a plurality of supports, each of the plurality of supports extending from a respective proximal end at the frame to a respective distal end located forward of the frame, an anchor plate secured to the distal feeder housing end, a frame pivot joining the frame to the anchor plate to be rotatable about a frame pivot axis, a frame actuator comprising at least one single-acting hydraulic actuator joining the frame to the anchor plate, and a hydraulic circuit connected to a drive input of the frame actuator, and comprising an accumulator in fluid communication with the drive input. The hydraulic circuit is configured to allow the frame to pivot relative to the anchor plate about the frame pivot axis by displacing a quantity of hydraulic fluid from the frame actuator to the accumulator.

In some exemplary aspects, the distal feeder housing end comprises a faceplate mounted on a faceplate pivot to be rotatable about a faceplate pivot axis, and the faceplate is rigidly connected to the anchor plate by a releasable connection.

In some exemplary aspects, the frame pivot axis is parallel to the faceplate pivot axis.

In some exemplary aspects, a faceplate actuator is provided and configured to rotate the faceplate about the faceplate pivot axis. The feeder housing actuator may be a first group of one or more double-acting hydraulic actuators, and the faceplate actuator may be a second group of one or more double-acting hydraulic actuators. A control system may be provided and configured to selectively operate the feeder housing actuator and the faceplate actuator to fix the anchor plate at a predetermined position, and to selectively operate the frame actuator to resiliently position the frame at a predetermined position relative to the anchor plate. The control system may also have a resistance controller configured to selectively change at least one of a spring rate or a damping rate of the frame actuator.

In another exemplary aspect, there is provided an agricultural combine having a chassis configured for movement across a surface, a feeder housing having a proximal feeder housing end movably attached to the chassis, and a distal feeder housing end located remotely from the chassis, a feeder housing actuator configured to raise and lower the distal feeder housing end relative to the proximal feeder housing end, and a header attached to the distal feeder housing end. The header includes: a frame, a plurality of supports, each of the plurality of supports extending from a respective proximal end at the frame to a respective distal end located forward of the frame, an anchor plate secured to the distal feeder housing end, a frame pivot joining the frame to the anchor plate to be rotatable about a frame pivot axis, a frame actuator connected between the anchor plate and the frame and configured to resiliently hold the frame at a predetermined position relative to the anchor plate, and to allow the frame to move through a range of motion relative to the anchor plate, upon compression and/or extension of the frame actuator The frame actuator may comprise at least one single-acting hydraulic actuator joining the frame to the anchor plate, and a hydraulic circuit connected to a drive input of the frame actuator, and comprising an accumulator in fluid communication with the drive input. The hydraulic circuit is configured to allow the frame to pivot relative to the anchor plate about the frame pivot axis by displacing a quantity of hydraulic fluid from the frame actuator to the accumulator.

The frame actuator may comprise one or more mechanical or pneumatic springs.

In some exemplary aspects, the distal feeder housing end comprises a faceplate mounted on a faceplate pivot to be rotatable about a faceplate pivot axis, and the faceplate is rigidly connected to the anchor plate by a releasable connection. The agricultural combine may further include a faceplate actuator configured to rotate the faceplate about the faceplate pivot axis. In some exemplary aspects, the feeder housing actuator comprises a first group of one or more double-acting hydraulic actuators, and the faceplate actuator comprises a second group of one or more double-acting hydraulic actuators.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide suspension systems for headers for agricultural equipment, such as combines, swathers, windrowers, and the like. It will be appreciated that other embodiments may be used in other types of machines having a similar arrangement of parts, upon incorporation of the appropriate features of the inventions herein.

Figure 1:
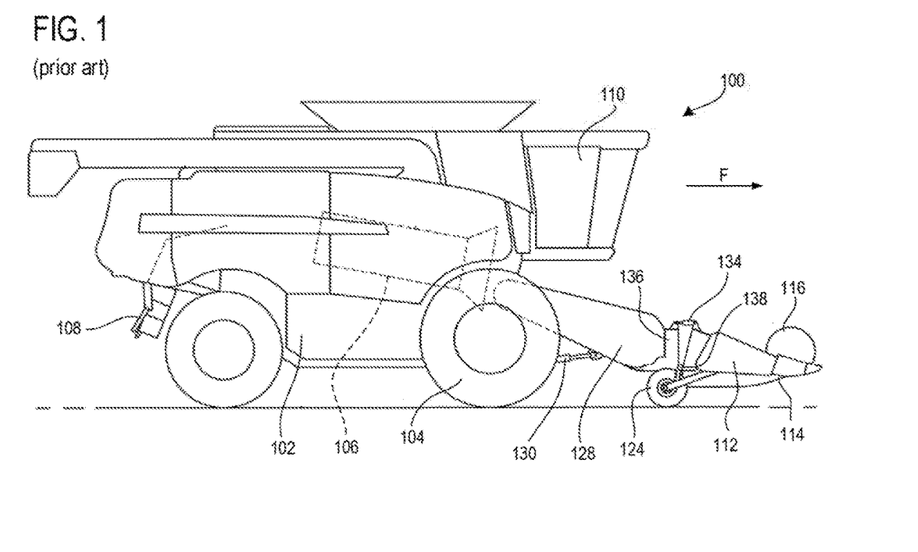
FIG. 1 is a side view of a prior art agricultural combine.

FIG. 1 illustrates an example of a prior art agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
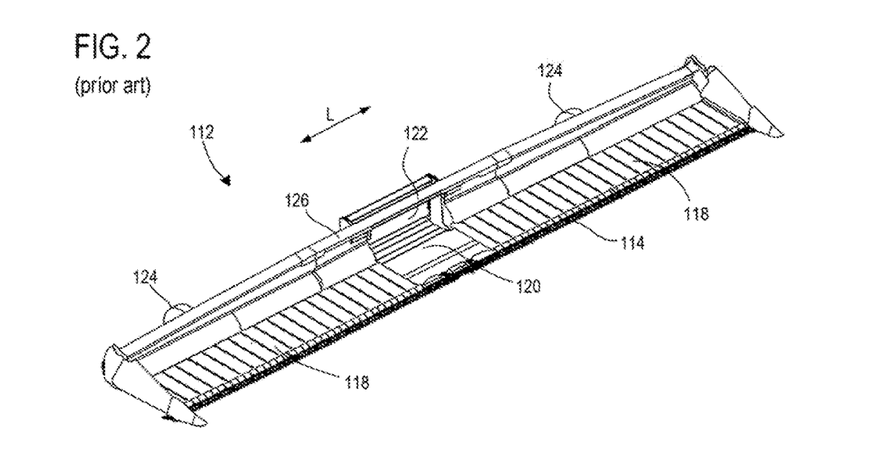
FIG. 2 is an isometric view of a prior art header.
Figure 3:
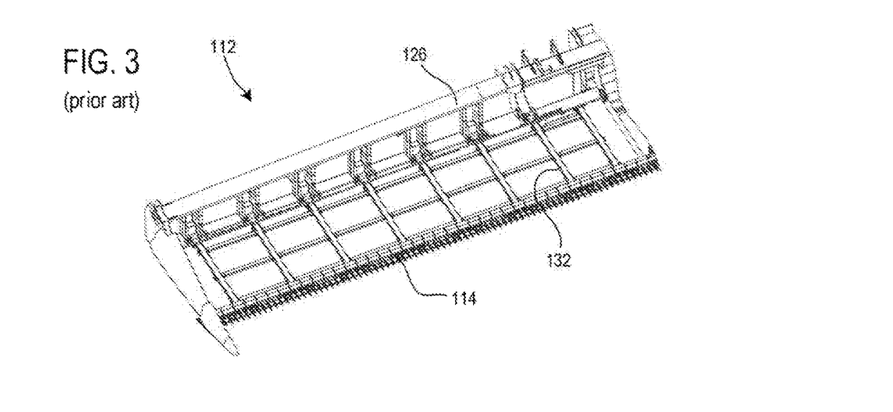
FIG. 3 is an isometric view of a portion of a prior art header frame.

Referring also to FIGS. 2 and 3, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include gauge wheels 124 or skids to control the height of the header 112 over the ground.

The header 112 is built on a frame 126, which is attached to the chassis 102 of the combine 100 by a feeder housing 128. The feeder housing 128 is configured to convey crop material backwards from the header 112 to the threshing and separating system 106. The feeder housing 128 may be movable by one or more feeder housing actuators 130 to raise and lower the header 112 relative to the ground.

The illustrated exemplary header 112 is a unitary header having a single frame 126 that extends continuously between the ends of the header 112 in the lateral direction L. In other embodiments, the header 112 may comprise a multi-segment or articulated header having a center section and one of more wing sections movably attached to the lateral end of the center section by pivots or linkages.

The header 112 also includes a number of supports 132 that extend forward from the frame 126 to hold parts such as the cutter bar 114, conveyors 118, or the like. The supports 132 may be rigidly attached to the header 112, or attached by movable mounts, such as pivots or linkages. In the case of movable supports 132, a suspension may be used to control the motion of the supports 132. For example, each support 132 may have its own spring and/or damper system, which is intended to allow the supports 132 to move up and down individually or in groups to follow local undulations along the lateral direction L. Skids, gauge wheels or other ground supports may be located below the supports 132 to generate a lifting force via contact with the ground. The positions of the ground supports and the spring and damping properties of the movable connections may be adjustable to tailor the header 112 for use in particular operating conditions. In addition, the positions of the supports 132, such as their angular orientation (downward tilt) relative to the frame 126 may be adjustable.

As noted above, the feeder housing actuators 130 raise and lower the header 112. In certain prior art headers, additional position control is provided by a tilt actuator 134 that controls the angle of the frame 126 relative to an anchor plate 136 mounted on the feeder housing 128. In particular, the tilt actuator 134 comprises a double-acting hydraulic actuator that is operated to pivot the frame 126 about a frame pivot axis. In this system, the tilt actuator 134 can be moved through a range of positions by the operator (or a control system), but the tilt actuator 134 cannot be back-driven by forces applied to the frame 126. Thus, the tilt actuator 134 does not provide any spring or damping function during operation of the header 112. Instead, all spring and damping function—such as it is—is provided by actively driving the feeder housing actuators 130 to raise and lower the header 112, and by the compliance of the movable supports 132, if used.

Exemplary embodiments of a header suspension replace the conventional tilt actuator 134 with a spring mechanism that is configured to allow the header frame to pivot backwards when the header encounters obstacles or ground undulations that cannot be addressed by automated motion of the feeder housing actuators 130 and movable supports 132.

Figure 4:
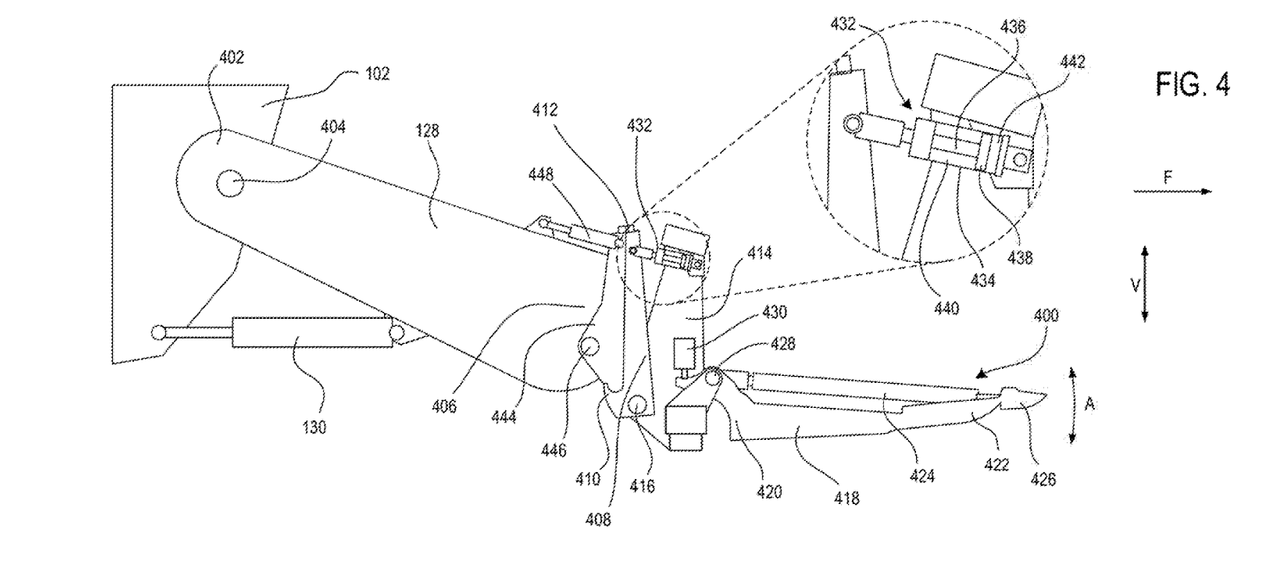
FIG. 4 is a side view of a header illustrating an exemplary embodiment of a header suspension.

Referring to FIG. 4, the header suspension system is used with a vehicle chassis 102, which is configured for movement across the ground by wheels, tracks, or the like. In this example, a header 400 is mounted to the chassis 102 by a feeder housing 128. (Portions of the header 400 are removed to illustrate the underlying structure.) The proximal end 402 of the feeder housing 128 is mounted to the chassis 102 at a pivoting joint 404, such as a hinge or trunnion, and the distal end of the feeder housing 128 is connected to the header 400. A feeder housing actuator 130 connects the feeder housing 128 to the chassis 102, and is operable to raise and lower the distal end 406 of the feeder housing 128 relative to the ground.

The feeder housing actuator 130 may comprise one or more individual actuators, such as hydraulic actuators, mechanically- or electrically-driven linkages, or the like. The feeder housing actuator 130 preferably is a positive position control mechanism, which prevents the feeder housing actuator 130 from moving unless commanded to do so by the operator or a control system. Thus, external forces applied to the feeder housing 128 will not change the position of the feeder housing actuator 130 except where a control circuit is provided to convert such forces into control signals that are input into the controller (e.g., the control system might automatically raise the feeder housing 128 upon determining that a hydraulic pressure in the feeder housing actuator 130 exceeds a safe level). During normal operation, the feeder housing actuator 130 may be operated to continuously raise and lower the header 400 to account for undulations in the ground, as known in the art. The feeder housing actuator 130 preferably does not include any lost-motion mechanisms (e.g., a pin-and-slot mount that would allow the feeder housing 128 to move through a limited range of movement without applying a load to the feeder housing actuators 130).

The header 400 includes an anchor plate 408 that is rigidly connected to the distal end 406 of the feeder housing 128. The anchor plate 408 may have a generally flat shape, but this is not required. The anchor plate 408 may be permanently connected to the feeder housing 128, but more preferably is releasably connected to the feeder housing 128 by, for example, conventional header mounting mechanisms such as a hook 410 and a bolted or remotely controlled hydraulic connection 412. The anchor plate 408 may surround and form part of the crop outlet 122, but this is not strictly required.

The header 400 also includes a frame 414, which is pivotally connected to the anchor plate 408 by a frame pivot 416, such as one or more hinges or trunnion connections. The frame pivot 416 forms a frame pivot axis of rotation, which preferably extends in the lateral direction L. The frame 414 holds various working parts of the header 400, which may include devices such as reels, crop dividers, conveyors, cutter bars, and the like. In the shown example, the frame 414 has a plurality of supports 418 that extend from respective proximal ends 420 to respective distal ends 422 located forward of the frame in the forward direction F. Each support 418 is configured to support one or more operative components, such as a draper conveyor roller support 424 or a portion of a cutter bar 426.

The supports 418 may be rigidly connected to the frame 414 by welds or by being bolted in place. In the shown example, however, the proximal ends 420 of all of the supports 418 are movably mounted to the frame 414 to rotate about respective support pivots 428. Thus, the distal ends 422 of the supports 418 are movable in an arcuate path A relative to the frame 414. The angular positions of the supports 418 may be adjustable, such as by adjusting the state of extension of a pneumatic spring/damper 430, a hydraulic spring 430, a mechanical spring (e.g. torsion bar or coil spring) 430, or the like, or other adjusting mechanisms, as known in the art. The supports 418 may include any type of local suspension to control motion relative to the frame 414. For example, each support 418 may be mounted by a flexible mount such as a torsion link as described in U.S. Pat. No. 8,051,633, which is incorporated herein by reference. It will also be appreciated that one or more supports 418 may be fixed, while the remainder are movable relative to the frame 414. Some or all of the supports 418 also may be connected to each other, such as by cross-braces or the like. Other alternatives and variations will be apparent to persons of ordinary skill in the art in view of the present disclosure.

A frame actuator 432 joins the frame 414 to the anchor plate 408. The frame actuator 432 comprises one or more single-acting hydraulic actuators. For example, each frame actuator 432 may comprise an assembly having a cylinder 434 attached to one of the frame 414 and anchor plate 408, and a piston rod 436 attached to the other of the frame 414 and anchor plate 408. The piston rod 436 is connected to a piston 438, and slidably disposed within the cylinder 434 to create a moving, sealed partition within the cylinder 434. Hydraulic fluid ports (not shown) are provided on each side of the piston 438, within one port being connected to a supply of pressurized fluid, and the other port being connected to a vent, such as described in more detail below. Thus, the piston 438 forms a pressure chamber 440 and a vent chamber 442, the volumes of which vary as the piston 438 moves along the cylinder 434.

Figure 5:
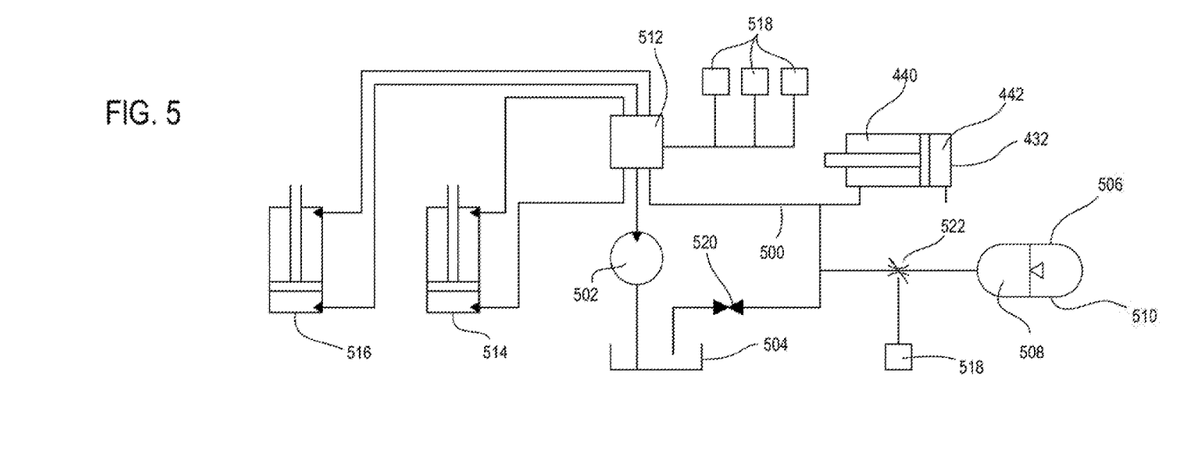
FIG. 5 illustrates an exemplary embodiment of a hydraulic circuit.

Referring now also to FIG. 5, the pressure chamber 440 of the frame actuator 432 is connected by a hydraulic circuit 500 to a source of pressurized fluid 502, such as a hydraulic pump operated by a motor mounted to the chassis 102. As will be understood from the following explanation, the connection to the pressure chamber 440 is the drive input for the frame actuator. The vent chamber 442 may be connected to a hydraulic fluid sump 504 or to air. A return spring (not shown) may be provided in the vent chamber 442 to apply a biasing force to push the piston 438 towards the pressure chamber 440, but this is not required.

The hydraulic circuit 500 also includes an accumulator 506 in fluid communication with the drive input of the frame actuator 432. The accumulator 506 includes, in general terms, a variable-size chamber 508 to contain a variable quantity of hydraulic fluid, and a spring resistance that biases the variable-size chamber 508 into a less voluminous state. For example, the accumulator 506 may comprise a rigid outer canister 510 in which a flexible bladder is mounted in fluid communication with the hydraulic circuit 500, and pressurized gas located within the canister 510 but outside the bladder to apply pressure against the bladder. Alternatively, the variable-size chamber 508 may be defined by a piston that slides in the canister 510, with a mechanical spring (e.g., a coil spring) applying a biasing force to move the piston to reduce the size of the variable-size chamber 508. Accumulators are known in the art of hydraulic circuits, and other alternatives and variations for accumulators will be apparent to persons of ordinary skill in the art in view of the present disclosure.

In operation, the source of pressurized fluid 502 and the accumulator 506 are connected via the hydraulic circuit 500 to the drive input of the frame actuator 432. The pressurized fluid generates a force on the piston 438 to move the piston towards the vent chamber 442 end of the cylinder 434. In the example of FIG. 4, such force biases the frame 414 towards the anchor plate 408, thus providing a lifting force on the frame 414. The static position of the frame 414 relative to the anchor plate 408 is controlled by changing the pressure of the fluid to balance the weight of the header 400 supported on the frame pivot 416. However, as the combine moves along a field or road, the portion of the header 400 supported on the frame pivot 416 will experience dynamic loads in the vertical direction V, which will generate variable downward forces at the center of gravity of the mass, which is located in front of the frame pivot 416. Such forces generate backpressure in the pressure chamber 440 of the frame actuator 432. When this happens, the accumulator 506 allows the hydraulic fluid in the pressure chamber 440 to vent back into the hydraulic circuit 500, to fill the variable-size chamber 508 against the bias of the accumulator's pressurized gas or other spring. Thus, the frame actuator 432 allows the frame 414 to move in response to such forces, rather than rigidly holding the frame 414 in place as would a conventional tilt actuator 134.

Similarly, when the frame 414 experiences a lifting force, such as when the cutter bar 426 or supports 418 contact the ground, the piston 438 can move towards the vent chamber side of the cylinder 434. When this happens, the pressurized gas or other spring in the accumulator 506 forces fluid from the variable-size chamber 508 out of the accumulator and into the hydraulic circuit 500 to provide fluid to fill the pressure chamber 440. Thus, the accumulator 506 provides a continuous force to help raise the frame 414, even if the source of pressurized fluid 502 is disconnected from the hydraulic circuit at the time the lifting force is applied.

The operation of the accumulator 506 may be modified by changing various variables. For example, the spring rate can be modified by changing the gas pressure or spring rate. In addition, the damping properties of the system can be varied by changing the orifice size of a variable flow restrictor 522 located in the hydraulic circuit 500 between the accumulator 506 and the drive input of the frame actuator 432. Such control may be performed via a remote control 514, which may be located in the vehicle cab 110, such as a conventional rheostatic or digitally-controlled actuator.

The foregoing header suspension is expected to provide enhanced performance to allow the combine to operate at higher ground speeds. For example, the frame actuator 432 allows the mass of the header 400 supported on the frame pivot 416 to rotate backwards about a single point when it experiences a lifting load, thereby translating much of the upwards force into a lateral motion. Such motion about a single pivot axis would not resist the input force as much as other header systems, such as those that use multi-bar linkages to raise and lower the header along a more vertical path, because less vertical lifting of the header mass is required. Thus, the system can react more freely to external loads, leading to faster suspension cycle times and less load transfer to the parts. It is expected that this benefit may be enhanced by locating the frame pivot 416 to join a lower end of the frame 414 to the anchor plate 408, in which case the frame actuator 432 may be conveniently located above the frame pivot 416, but this is not strictly required.

It is also expected that the operation of the header suspension can be further enhanced by rigidly mounting the anchor plate 408 (either releasably or permanently) to a movable faceplate 444 on the feeder housing 128. For example, a movable faceplate 444 may be mounted to the distal end 406 of the feeder housing 128 by a faceplate pivot 446, to thereby allow the faceplate 444 to pivot about a faceplate pivot axis defined by the faceplate pivot 446. The faceplate pivot axis preferably is parallel the lateral direction L, and preferably is also parallel to the frame pivot axis. The position of the faceplate 444 is controlled by a faceplate actuator 448.

The faceplate actuator 448 may comprise one or more individual actuators, such as hydraulic actuators, mechanically- or electrically-driven linkages, or the like. The faceplate actuator 448 preferably is a positive position control mechanism, which prevents the faceplate 444 from moving about the faceplate pivot 446 unless commanded to do so by the operator or a control system. Thus, external forces applied to the faceplate 444 will not change the position of the faceplate 444 except where a control circuit is provided to convert such forces into control signals that are input into the controller (e.g., the control system might automatically tilt the faceplate 444 back to raise the header 400 upon determining that a hydraulic pressure in the faceplate actuator 448 exceeds a safe level). During normal operation, the faceplate actuator 448 may be operated to continuously raise and lower the header 400 to account for undulations in the ground. The faceplate actuator 448 preferably does not include any lost-motion mechanisms (e.g., a pin-and-slot mount that would allow the faceplate 444 to move through a limited range of movement without applying a load to the faceplate actuator 448).

Referring again to FIG. 5, the various parts of the header suspension may be operated by a controller 512, such as an arrangement of conventional valves and fluid logic circuits. For example, the source of pressurized fluid 502 may have an output fluidly connected to the controller 512, and the controller 512 may have a first outlet leading to the hydraulic circuit 500 feeding the frame actuator 432, and pairs of outlets leading to a first group of one or more double-acting actuators 514 operating as the feeder housing actuator 130, and a second group of one of more double-acting actuators 516 operating as the faceplate actuator 448.

Various inputs 518 are provided to operate the controller 512. The inputs 518 may comprise analog or digital signals sent by a computerized header controller, signals or inputs generated by manual controls (e.g., electric switches, hydraulic valves, or the like), and combinations thereof. In operation, the controller 512 maybe used to operate the double-acting hydraulic actuator(s) 514, 516 to fix the faceplate 444 and the anchor plate 408 in a predetermined position relative to the chassis 102. Such predetermined position might change periodically or continuously during operation to account for undulations in the surface below the header 400, but generally the position of the faceplate 444 will remain at a known and intended position. In contrast, the controller 512 operates the frame actuator 432 to resiliently position the frame 414 at a predetermined position relative to the anchor plate 408 by pumping hydraulic fluid into the pressure chamber 440 or venting it to the sump 504 via a valve 520. Thus, the frame 414 can resiliently move through a range of movement that is not specifically controlled by the controller 512.

Figure 6:
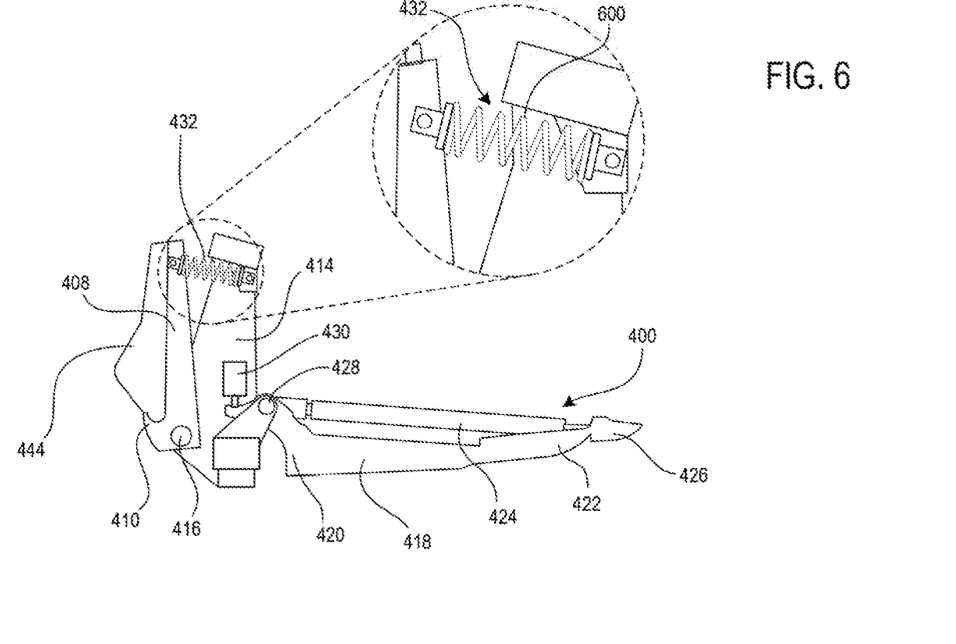
FIG. 6 is a side view of another header illustrating another exemplary embodiment of a header suspension.
Figure 7:
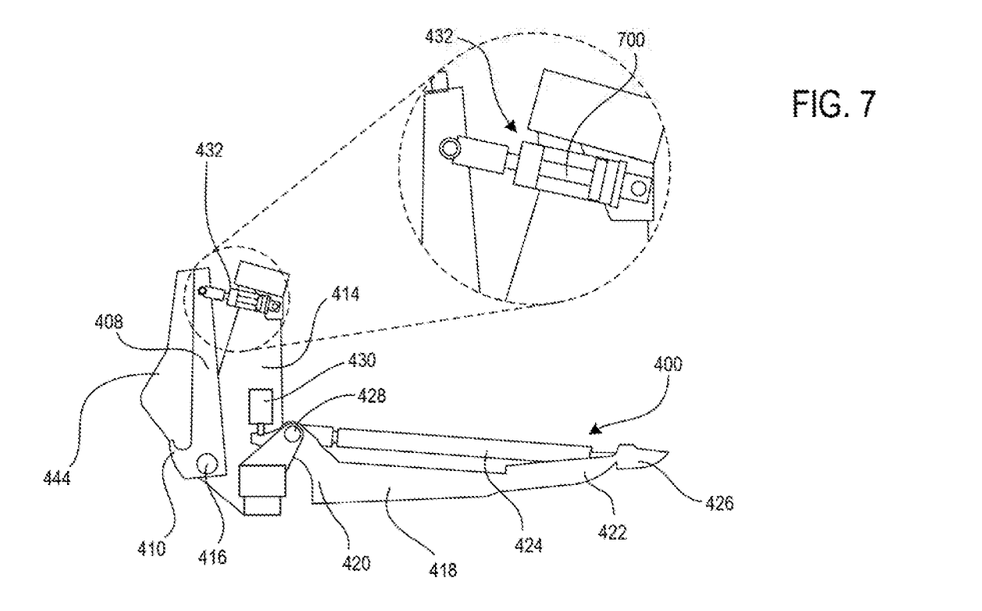
FIG. 7 is a side view of another header illustrating another exemplary embodiment of a header suspension.

FIGS. 6 and 7 shows other exemplary embodiments in which the frame actuator 432 comprises alternative spring mechanisms to allow the header frame to pivot backwards when the header encounters obstacles or ground undulations that cannot be addressed by automated motion of the feeder housing actuators 130 and movable supports 132. In FIG. 6, the frame actuator 432 comprises one or more mechanical springs 600, such as coil springs, torsion springs, or the like, which may be mounted to operate in compression or tension. In FIG. 7, the frame actuator 432 comprises one or more pneumatic springs 700, which provides a resilient spring force via compression of a gas (e.g., a pneumatic piston and cylinder arrangement). In each case, the frame actuator 432 may be preloaded or adjusted to set a starting position and resilient force, such as by adjusting the mounting positions of one or both ends of the spring 600 or pneumatic spring 700, pre-compressing the spring 600, changing the gas pressure in the pneumatic spring 700, and so on.

In each of the foregoing embodiments, the frame actuator 432 resiliently positions the frame 414 at a predetermined position relative to the anchor plate 408. This resilient nature of the frame actuator 432 allows the frame 414 to move relative to the anchor plate 408 through a range of motion, upon compression and/or extension of the frame actuator 432. The exact measure of the range of motion, and the resilient properties of the frame actuator 432 (e.g., spring rate, damping rate, etc.) may be selected without undue experimentation, based on expected operating conditions, dimensions and other properties of the header, and other variables, as will be appreciated by persons of ordinary skill in the art.

While the foregoing embodiments describe a header suspension including a vehicle chassis and feeder housing, it will be appreciated that embodiments of the invention may comprise only a header assembly without being attached to a feeder housing. Furthermore, embodiments may use a frame actuator in conjunction with a faceplate actuator, and without a feeder housing actuator, or with a feeder housing actuator and no faceplate actuator. Other embodiments may omit both the faceplate actuator and the feeder housing actuator. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural vehicle header for an agricultural vehicle having a forward direction of travel, said agricultural vehicle header suspension comprising:
   a header frame;
   a plurality of supports, each of the plurality of supports extending in the forward direction from a respective proximal end at the header frame to a respective distal end located forward of the frame;
   the header frame being pivotably coupled to an anchor plate, the anchor plate having an upper end, a releasable connection that is releasably mountable to a feeder housing of the agricultural vehicle, a lower end, and a frame pivot on the lower end that joins the header frame to the anchor plate, the header frame being rotatable about a frame pivot axis of the frame pivot, the frame pivot axis extending perpendicularly to the forward direction of the agricultural vehicle; and
   a frame actuator connected between the upper end of the anchor plate and the header frame to (i) resiliently hold the header frame at a predetermined position relative to the anchor plate, and (ii) allow the header frame to move about the frame pivot axis through a range of motion relative to the anchor plate and the feeder housing, upon compression or extension of the frame actuator.

2. The agricultural vehicle header of claim 1, wherein the frame actuator comprises:
   at least one single-acting hydraulic actuator joining the frame to the anchor plate; and
   a hydraulic circuit connected to a cylinder of the frame actuator, and comprising an accumulator in fluid communication with the cylinder, the hydraulic circuit being configured to allow the frame to pivot relative to the anchor plate about the frame pivot axis by displacing a quantity of hydraulic fluid from the at least one single-acting hydraulic actuator to the accumulator.

3. The agricultural vehicle header of claim 1, wherein the frame pivot joins a lower end of the frame to the anchor plate, and the frame actuator is located above the frame pivot and joins an upper portion of the frame to the anchor plate.

4. The agricultural vehicle header of claim 2, wherein the hydraulic circuit comprises a resistance controller configured to selectively change at least one of a spring rate or a damping rate of the frame actuator.

5. The agricultural vehicle header of claim 4, wherein the resistance controller comprises a variable flow restrictor.

6. The agricultural vehicle header of claim 1, wherein the frame actuator comprises a mechanical or pneumatic spring.

7. The header of claim 1, wherein the anchor plate is configured to be connected to a faceplate of the feeder housing by the releasable connection.

8. The header of claim 7, wherein the frame pivot axis is parallel to a pivot axis of the faceplate.

9. The header of claim 2, wherein the at least one hydraulic actuator is a single-acting hydraulic actuator.

10. The header of claim 1, further comprising a control system configured to selectively operate the frame actuator to resiliently position the frame at a predetermined position relative to the anchor plate.

11. The header of claim 10, wherein the control system further comprises a resistance controller configured to selectively change at least one of a spring rate or a damping rate of the frame actuator.

12. The header of claim 1, wherein one or more of the supports comprises a movable support having a respective proximal end movably attached to the frame and a respective distal end movable along an arcuate path relative to the frame.

13. The header of claim 12, wherein all of the supports comprise a movable support.

14. The header of claim 1, further comprising a cutter bar attached to the respective distal ends of one or more of the supports.

15. An agricultural combine comprising:
    a chassis configured for movement across a surface;
    a feeder housing having a proximal feeder housing end movably attached to the chassis, and a distal feeder housing end located remotely from the chassis;
    a feeder housing actuator configured to raise and lower the distal feeder housing end relative to the proximal feeder housing end; and
    the header of claim 1 attached to the distal feeder housing end.

16. The agricultural combine of claim 15, wherein a faceplate is mounted at the distal feeder housing end on a faceplate pivot that defines a faceplate pivot axis, the faceplate being rigidly connected to the anchor plate by the releasable connection, and wherein the agricultural combine further comprises a faceplate actuator configured to rotate the faceplate about the faceplate pivot axis.

17. The agricultural combine of claim 16, wherein the feeder housing actuator comprises a first group of one or more double-acting hydraulic actuators, and the faceplate actuator comprises a second group of one or more double-acting hydraulic actuators.

18. The agricultural combine of claim 16, wherein the frame pivot axis is parallel to the faceplate pivot axis.

19. The agricultural combine of claim 16, wherein the faceplate actuator comprises one or more double-acting hydraulic actuators.

20. The agricultural combine of claim 15, wherein the frame actuator comprises a mechanical or pneumatic spring.

21. The agricultural combine of claim 15, wherein the feeder housing actuator comprises one or more double-acting hydraulic actuators.

* * * * *